United States Patent Office 3,293,762
Patented Dec. 27, 1966

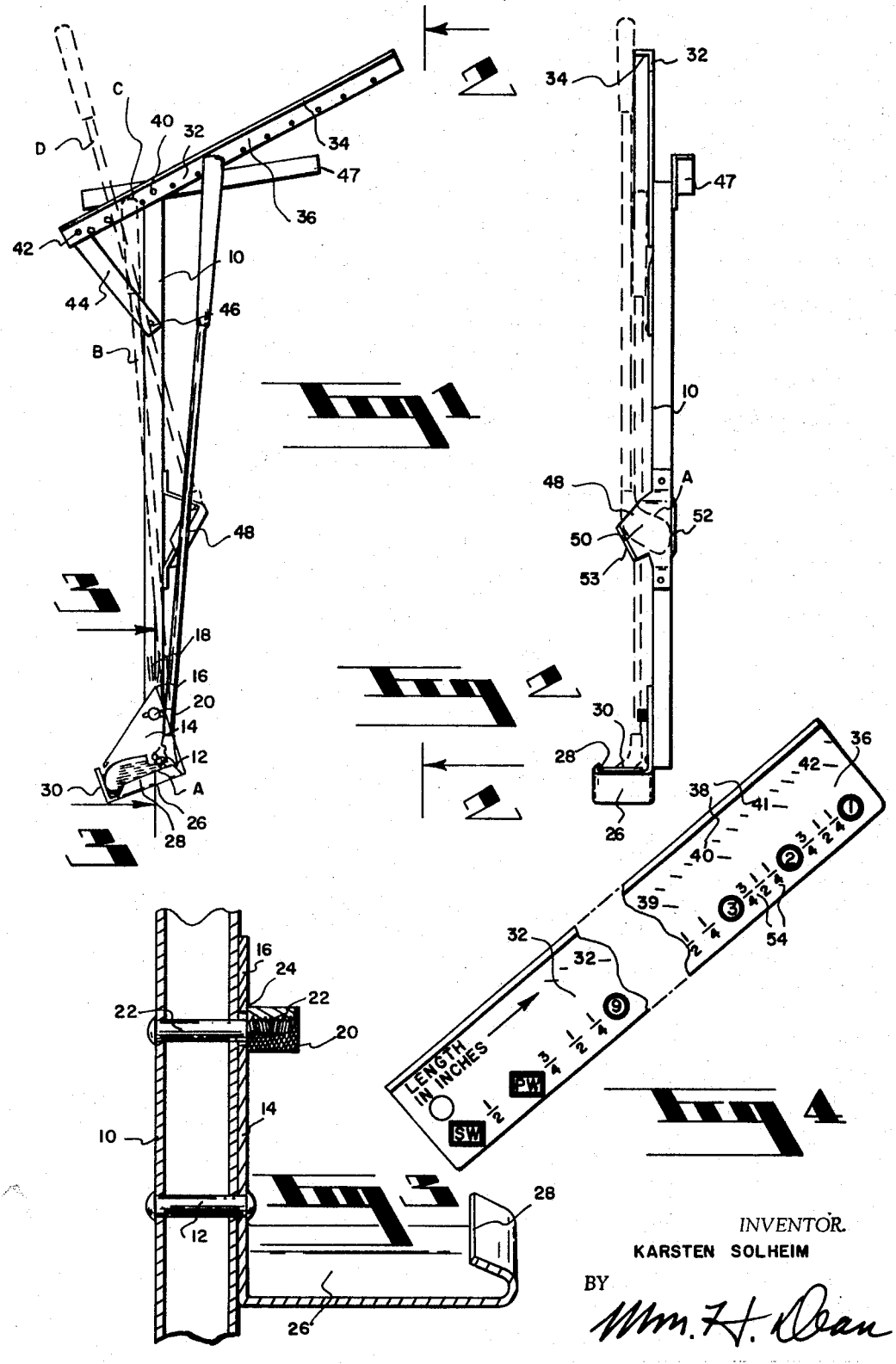

3,293,762
GAUGE AND MEASURING DEVICE FOR
GOLF CLUBS
Karsten Solheim, 10412 N. 37th St.,
Phoenix, Ariz. 85251
Filed June 22, 1964, Ser. No. 376,923
9 Claims. (Cl. 33—174)

This invention relates to a gauge and measuring device for golf clubs and more particularly to a gauge and measuring device for measuring the length, lie and loft of golf clubs.

Heretofore golfers have generally faced problems resulting from a lack of uniformity in the angular calibration of golf clubs and their relative length. As for example, the angle of lie of a golf club head relative to the axis of the handle and its relative length has been a factor which has caused considerable confusion in the choosing and the consistent use of golf clubs and, further, standard golf clubs have been found to vary greatly in the angle of loft of the ball striking face on the head of the golf club with respect to the axis of the handle of a golf club.

The loft angle of the striking face of a golf club head relative to the axis of the golf club handle has a critical relationship to the trajectory of a golf ball when hit by the club. As for example, varying the angle of loft of the striking face of a golf club varies the angle of departure of the ball from a golf tee with respect to the horizontal. Such varying angles of departure of the ball as it is struck may vary the driving distance as well as the relative trajectory of the ball. This of course, also depends upon the force with which the ball is struck, but other factors being equal, a golfer must have to rely upon the choice of a particular club having a particular loft angle with relation to other clubs so that he may have the utmost consistency in the driving of golf balls and may thereby more nearly perfect his practice.

It has been recognized that many of the better sets of golf clubs are not uniformly graduated, one from the other, with respect to the loft angle or the lie angle in relation to the axis of the golf club handle and consequently a golfer cannot attain uniformity of practice since either of such angles or a combination of both may have the effect of inaccuracy on any particular shot. For example, inaccuracy of the lie angle may cause a shot to be inaccurate and go either to the right or the left depending upon the direction in which the lie angle varies and an inaccuracy in the loft angle may vary the angle of departure with respect to the horizontal of any shot made.

It has been apparent that the golf profession and golf players at large have not been provided with a suitable standard for measuring the lie and loft angles of golf clubs and, further, the art has lacked a very simple and readily and easily useful tool or device for such purposes.

Accordingly, it is an object of the present invention to provide a gauge and measuring device for golf clubs which very efficiently, easily and accurately may be used to measure the length, lie and loft of golf clubs in order that a set of clubs may be accurately adjusted to have uniform graduations from one club to another and to maintain constant lie angles of all of the clubs throughout the entire set.

Another object of the invention is to provide a gauge and measuring device for golf clubs which very simply and easily measure the lie angle and overall length of a golf club in one simple concurrent operation.

Another object of the invention is to provide a gauge and measuring device for golf clubs which may very readily and easily be used to measure the relative loft angles of clubs of a set and to thereby permit uniform checking and/or adjustment of such loft angles in order that such angles meet a standard of graduation which will provide for uniformity of golf practice.

Another object of the invention is to provide a gauge and measuring device for golf clubs wherein a very simple frame is provided with an adjustable lie angle measuring member engagable with the normally bottom surface and toe area of a golf club head and which is provided with a length measuring arm which is disposed at a generally obtuse angle with respect to the axis of a golf club handle when the head of the golf club is so engaged with the lie angle measuring member in order concurrently to measure the lie angle and the length of a golf club.

Another object of the invention is to provide a very simple and easily operable gauge and measuring device for golf clubs which efficiently measures the length, lie and loft of golf clubs and which is provided with a frame and measuring arm means pivoted thereto and usable at an angle relative thereto and also collapsible into alignment with the frame to thereby render the overall gauge and measuring device very compact when not in use.

Another object of the invention is to provide a very simple gauge and measuring device which may be readily usable by professionals or amateur golfers and which will help all golfers in maintaining proper angular calibration of their golf clubs with respect to the loft and lie angles thereof.

Further objects and advantages of the present invention may be apparent from the following specification, appended claims and acompanying drawings, in which:

FIG. 1 is a side elevational view of a gauge and measuring device for golf clubs showing golf clubs in various positions relative thereto and illustrated in broken lines to indicate the use of the device for measuring lie and loft angles of golf clubs;

FIG. 2 is a view similar to FIG. 1, but taken from line 2—2 thereof;

FIG. 3 is an enlarged fragmentary sectional view taken from the line 3—3 of FIG. 1; and FIG. 4 is an enlarged fragmentary elevational view of the calibrated scale of the device of the invention showing calibrations thereon which relate to the overall length of the golf clubs and also the loft angles thereof.

As shown in FIG. 1 of the drawings, the device of the invention is provided with a frame member 10 which is an elongated member constructed preferably of a rectangular in cross-sectional tube. This frame 10, however, may be constructed of any suitable material and any elongated structure of suitable cross-section.

Pivotally mounted in connection with the frame 10 near one end thereof by means of pivot pin 12 is a lie angle measuring member 14. This member 14 is provided with a pointer portion 16 operable adjacent a calibrated scale 18 on the frame 10. The pointer 16 being pivotal about the axis of the pin 12 and fixed in position by means of a thumb screw 20 screw threaded on an externally screw threaded pin 22 fixed in the frame 10. The pin 22 extends through an arcuate slot 24 in the lie angle measuring member 14 so that it may be pivotally moved relative to the pin 20 in order to set the pointer 16 at various angular positions relative to the calibrated scale 18 on the frame 10.

The lie angle measuring device 14 is provided with a shelf 26 disposed at substantially right angles to the frame 10 in one plane, as shown in FIG. 3 of the drawings. This shelf 26 is disposed to engage the normally bottom side of a golf club head shown by broken lines A in FIG. 1 of the drawings. Additionally, an inturned flange structure 28 of the lie angle measuring member 14 is disposed to engage a ball striking face portion of the club while an abutment end portion 30 integral with the lie angle measuring member 14 is disposed to be engaged by the toe of the golf club head to thereby maintain a three point engagement of the head precisely to hold it in fixed position relative to the frame 10. A handle of a given golf club, as shown by broken lines B in FIG. 1 of the drawings, may, when the head thereof is thus engaged extend into engagement with a length measuring member 32 near the opposite end of the frame 10 from the lie angle measuring member 14. An end portion C of the handle B engages an abutment portion 34 of the length measuring member 32 which is L-shaped in cross-section. A flat face 36 of the member 32 is provided with golf club length calibrations 38, as shown in FIG. 4 of the drawings, with which the end C of the golf club handle B is aligned to indicate the overall length of the club while calibrations 18, as indicated by the pointer 16, measure the lie angle of the club head relative to the longitudinal axis of the handle B. It will be seen that the length measuring member 32 is disposed normally at an obtuse angle to the axis of the handle B when the head of the golf club is engaged by the lie angle measuring member 14, as hereinbefore described.

The length measuring member 32 is pivoted by means of a pin 40 to one end of the frame 10 and a removable or releasable pin 42 in connection with the member 32 permits it to be connected or disconnected with an angular brace member 44 pivoted to the frame by means of a pin 46. Thus, when the pin 42 is released, both the brace 44 and the member 32 may be pivoted into parallel relation with the frame 10 in order to render the members compact with relation to the frame 10. Additionally, a support bar 41 also pivoted on the pin 40 may be pivoted into parallel relation with the frame 10 on the opposite side thereof from the member 32 so that the entire gauge and measuring device of the invention may be pivoted into compact position, if desired.

The member 47 may be placed on a horizontal surface such as a table with the frame element generally vertically disposed so that the calibrated scale portion 36 of the invention may be directed upward and so that golf clubs may be engaged with the device, as will be hereinafter described for indicating both the lie and length measurement as well as the loft angle measurements.

Secured to a side of the frame 10 substantially ninety degrees from that of the lie angle measuring member 14 is a loft angle measuring means 48. This means 48 is provided with a club head striking face engaging surface 50, also a flange 52 which engages a toe portion of a golf club head generally indicated by broken lines A in FIG. 2 of the drawings. Further, another flange 53 of the loft angle measuring means 48 is directed outwardly to engage a bottom or heel portion of the head A of a golf club so that it is engaged with three surfaces precisely to locate the golf club head so that the handle D projects across the member 32 and intersects with calibrations 54 to measure the loft angle of a golf club head relative to the axis of the handle D. In this manner, the handle D intersects the calibrations which are normally arranged to indicate the standard numbers of loft angle. If the handle D does not intersect, the number on the scale 54 corresponding with the loft number on the club, the shank of the club may be bent so that the loft angle coincides in a manner to cause the handle D to intersect with the number on the scale 54 which matches the apparent loft number on the club. Additionally, the lie angle of a set of clubs should also be in accordance with the length and should be uniform for all of the clubs in a set, therefore the adjustment of the lie angle, as hereinbefore described, can be made by bending the shank of the club so that all of the clubs of a set have the same lie angle in accordance with the pointer 16 and the calibrated scale 18 on the frame 10, as hereinbefore described.

It is well known that clubs of a given set vary in length and should therefor have a lie angle corresponding to the particular length of each respective club so that all of the clubs at their lie or bottom surfaces will naturally swing parallel to the ground while the golfer assumes substantially the same stance and elevation with the use of each and all of the clubs.

A golfer of a given height must therefor swing the head of a long handled club farther from his feet than he does that of a short handled club and, thus, the pointer 16 of the invention, when set at one calibration automatically serves as a uniform reference for lie angle of all of the clubs of a set which vary in handle length relative to each other.

Also, it will be apparent that golfers of different statures, heights and attitudes may require a particular lie angle which may be set with reference to the pointer 16 and calibrations 18. As for example, some golfers are relatively short compared to the length of standard clubs and additionally, other golfers are quite stocky rendering the holding of these clubs at a given elevation somewhat awkward and unnatural unless the lie angle adjusted to compensate and accordingly, coordinate with the particular length of the club being used.

Generally standards of lie angle are fairly well established for a given length of club which may be indicated by having the butt end C of the club shank B coincide with one of the calibrations 38 which are set forth in inches of length, however, the lie angle may be adjusted to suit a particular person in accordance with the calibrations 18 and the pointer 16, therefore the lie angle measuring member 14 may be set at the desired angle so that the angle of each club head may be adjusted to match a particular lie angle regardless of variations in length of the clubs so that all of the clubs of a set may have a uniform or matching lie angle in relation to their length while the various loft angles may be uniformly graduated from one club to the next in accordance with the precise calibrations 54 on the scale member 32 and with respect to the actual intersection of the handle D of a respective club with a respective calibration 54 and directly in accordance with the number of the loft angle designated on the club.

It will be obvious to those skilled in the art that various modifications of the present invention may be resorted to in a manner limited only by a just interpretation of the following claims.

I claim:

1. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member.

2. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; said length measuring means extending a considerable distance angularly and laterally of the longitudinal axis of the handle of said club and thereby adapted to meet and intersect ends of various golf club handles of various lengths, the length of a golf club being indicated on said scale.

3. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; said length measuring means extending a considerable distance angularly and laterally of the longitudinal axis of the handle of said club and thereby adapted to meet and intersect ends of various golf club handles of various lengths, the length of a club being indicated on said scale; said length measuring means having a handle end abutment ledge disposed generally in opposed relation to said alignment portion of said lie angle measuring member, whereby normally upper and lower end portions of a golf club may be abutted between said alignment portion and said handle end abutment portion concurrently to measure the lie angle and the length of a golf club.

4. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; said frame being an elongated member, said length measuring means being pivotally mounted on said frame and having means for fixing said length measuring means in said fixed use position and for releasing it to pivot into a substantially parallel position with respect to said frame when not in use.

5. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; a pivot means adjustably mounting said lie measuring member on said frame; a pointer and calibrated gauge means disposed to indicate relative angular pivotal adjustment between said lie angle measuring member and said frame; and means for fixing said lie angle measuring member on said frame in certain adjusted position relative thereto.

6. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; said length measuring means extending a considerable distance angularly and laterally of the longitudinal axis of the handle of said club and thereby adapted to meet and intersect ends of various golf club handles of various lengths, the length of a club being indicated on said scale.

7. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; toe abutment means carried by said lie angle measuring member for engaging the toe of a golf club head concurrently with the engagement of said alignment portion by the bottom portion of a golf club head.

8. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; said length measuring means extending a considerable distance angularly and laterally of the longitudinal axis of the handle of said club and thereby adapted to meet and intresect ends of various golf club handles of various lengths, the length of a club being indicated on said scale; toe abutment means carried by said lie angle measuring member for engaging the toe of a golf club head concurrently with the engagement of said alignment portion by the bottom portion of a golf club head.

9. In a gauge and measuring device for golf clubs the combination of: a frame; a lie angle measuring member pivoted and adjustably mounted on said frame and adapted to be fixed thereon in various angular dispositions relative thereto; a club head bottom engaging portion of said lie angle measuring member having a straight portion adapted to be engaged by a normally bottom portion of a golf club head; and a length measuring means comprising a bar element having a scale thereon in fixed use position on said frame in spaced relation to said lie angle measuring member and disposed at an obtuse angle to a golf club handle said scale registering with the end of the club to indicate club length when the head of said club is engaged and aligned at its normally bottom portion with said bottom engaging portion of said lie angle measuring member; toe abutment means and striking face engaging means disposed to engage toe and striking face portions of golf club heads respectively, when said bottom portion of said club is engaged with said alignment portion.

References Cited by the Examiner

UNITED STATES PATENTS

| | | | |
|---|---|---|---|
| 1,551,807 | 9/1925 | Dittmar | 33—168 X |
| 2,546,426 | 3/1951 | Bryant | 33—174 |
| 2,973,581 | 3/1961 | Rhodehamel | 33—174 |

LEONARD FORMAN, *Primary Examiner.*

S. S. MATTHEWS, *Assistant Examiner.*